United States Patent
Bergmann

(10) Patent No.: US 6,447,617 B1
(45) Date of Patent: Sep. 10, 2002

(54) HIGH EFFICIENCY CLEANING OF ROTATING FILTER MEDIA

(75) Inventor: Eugen O. Bergmann, St. George, UT (US)

(73) Assignee: Aqua-Aerobic Systems, Inc., Rockford, IL (US)

( * ) Notice: Subject to any disclaimer, the term of this patent is extended or adjusted under 35 U.S.C. 154(b) by 0 days.

(21) Appl. No.: 09/528,373

(22) Filed: Mar. 17, 2000

(51) Int. Cl.[7] .............................. B08B 3/02; B08B 3/04; B08B 9/093
(52) U.S. Cl. .................... 134/32; 134/22.18; 134/33; 134/36; 134/153; 134/159
(58) Field of Search .................. 134/22.18, 32, 134/33, 36, 153, 159

(56) References Cited

U.S. PATENT DOCUMENTS

| | | |
|---|---|---|
| 4,090,965 A | 5/1978 | Fuchs |
| 4,639,315 A | 1/1987 | Fuchs et al. |
| 5,362,401 A | 11/1994 | Whetsel |
| 5,374,360 A | 12/1994 | Weis |

*Primary Examiner*—Zeinab El-Arini
(74) *Attorney, Agent, or Firm*—Niro, Scavone, Haller & Niro

(57) ABSTRACT

In an apparatus containing rotating filter media that removes solids from a fluid stream, the invention provides devices and methods for improved cleaning of the filter media. Solids trapped on the filter media are removed by the application of a pressurized fluid spray system. The spray system has nozzles distributed across a spray arm. The nozzles create a generally elliptical spray fan pattern in contact with the filter media. The nozzles are spaced and angularly oriented on the spray arm so that adjacent spray fan contact areas overlap. This distribution and orientation equalizes the distribution of the washing flow and hydraulic energy over the filter area, thereby maintaining the filter material in a more uniformly clean and effective filtering condition.

3 Claims, 4 Drawing Sheets

HIGH EFFICIENCY CLEANING OF ROTATING FILTER MEDIA

FIELD OF THE INVENTION

The present invention applies generally to a filter apparatus for removing suspended solids from a fluid stream that is passed through filter material. More particularly, the present invention relates to methods and apparatus for cleaning the filter material.

BACKGROUND OF THE INVENTION

The invention claimed relates generally to the cleaning of rotating filter media commonly employed in the treatment of fluids such as water, wastewater and industrial process streams. Such filters often employ textile cloth membranes of cellulose base material, other natural fibers or synthetic fibers woven or napped into a tight fabric or matting. The cloth filter material is stretched over large drums or multiple disk-type frames. For non-limiting examples, see U.S. Pat. Nos. 4,090,965 and 4,639,315.

Typically, the filter media is placed in the flow path of a fluid stream containing suspended solid particles which are to be removed by the filtering process. The solid particles larger than the openings in the filter media are retained on the upstream, or influent, side of the filter media while the remaining flow (the filter effluent) passes through. Over time, these solids build up on the influent side of the filter media and impede the rate of filter effluent that passes through, thus necessitating a cleaning of the filter to remove the solids build-up.

Two common cleaning methods known in the art are forward pressure washing and reverse flow backwashing. Forward high pressure washing is required when normal low pressure backwashing cannot assure ultimate media cleanliness and when filtration cycles progressively shorten. A pressure washing cycle will reconstitute media cleanliness and re-establish acceptable media headloss. Typically, several backwash events will occur between pressure washing cycles. Each pressure wash operation may require the filter to stop processing influent, whereas the backwashing operation typically does not. Pressure washing is a process that applies a pressurized water spray from a series of nozzles evenly displaced along a stationary spray arm positioned to span a generally radial distance across the filter media. Other filter models may operate with fixed filter panels and moving pressure spray arms and backwash headers.

In the pressure spray applications, the pressurized spray delivered by the nozzles dislodges the accumulated solids on the filter media in part by overcoming the adhesive force of the solids against the influent side and dislodging them from the filter media or in part by driving embedded solids particles through the filter media into an effluent channel. Therefore, the effectiveness of the cleaning process includes the application of a sufficient washing flow volume and a sufficient spray pressure. Ideally the application of the wash flow and spray pressure would be evenly distributed across the filter media, but inherent limitations in the current mechanical design of spray arms and nozzle configurations and their angular orientation prevent known systems from functioning in this optimized condition. Moreover, it is desirable to minimize the length and frequency of filter cleaning cycles. Consequently, a cleaning process that cleans unevenly or fails to effectively remove the embedded solids will require more frequent cleaning and will produce less filter effluent.

It is a known problem with current methods of rotating disk filter media cleaning that the area of the rotating filter media nearest the axis of rotation is cleaned more thoroughly than the more radially distant areas. This is primarily due to the substantially higher relationship of applied wash flow per unit of filter area at the inner portion of the rotating filter media in the prior art. It is also a known problem that the filter areas which pass directly under the center portion of a pressurized spray nozzle are cleaned more thoroughly than the filter areas that pass under the space between nozzle centers, due to significant variations in the contact angle of individual jet streams emitted by the spray nozzles. The present invention provides improved cleaning methods and structures that overcome these and other limitations of current pressurized spray cleaning techniques.

A significant advantage of the present invention over prior art methods and devices for cleaning filter material is that the method and apparatus of the invention maintains the filter material in a uniformly clean, and thus, more effective filtering condition for longer periods of filter operation. This advantage results because the wash flow rate and hydraulic energy per unit of filter area are applied more evenly across the filter media, compared to prior art filter cleaning devices and methods. The invention significantly reduces the number of wash cycles required by the filter and, thus, highly efficient filtration is achieved.

It is a feature and an advantage of the present invention to provide a method and apparatus for cleaning filter media that does not subject the filter media to harsh operating conditions, thereby extending the operating life of the filter material.

It is also a feature and an advantage of the present invention that the nozzles on the stationary spray arm rotate the major axis of the spray fan contact area into an angular relationship with the axis of the spray arm to create a spray overlap condition.

It is also a feature and advantage of the present invention that the method and apparatus described can be positioned to apply a pressurized spray to either the influent side or the effluent side of the filter media.

It is also a feature and advantage of the present invention to improve media cleaning performance and increase filtered water production and reduce required spray water pressure, energy, washwater consumption, waste washwater volume and overall cost.

DEFINITION OF TERMS

The following terms are used in the claims of the patent and are intended to have their broadest meaning consistent with the requirements of law:

filter media—any permeable material, including but not limited to natural or synthetic fiber based, granular or membrane compositions;

nozzle—any device or orifice type opening which disperses wash water from a spray arm;

concentric band—a generally circular geometric strip having a width of a radial distance;

radial distance—a length measured along a straight line which intersects the center of a rotating filter element; and spray arm—any conduit for transmitting pressurized wash water to a spray nozzle or a plurality of spray nozzles.

Where alternative meanings are possible, the broadest meaning is intended. All words in the claims are intended to be used in the normal, customary usage of grammar and the English language.

BRIEF DESCRIPTION OF THE DRAWINGS

FIG. 1A is a lateral view of the filter of FIG. 1.

DETAILED DESCRIPTION OF THE PREFERRED EMBODIMENT

Set forth below is a description of what is currently believed to be the preferred embodiment or best example of the invention claimed. Future and present alternatives and modifications to this preferred embodiment are contemplated. Any alternatives or modifications which make insubstantial changes in function, in purpose, in structure or in result are intended to be covered by the claims of this patent.

Figure 1:
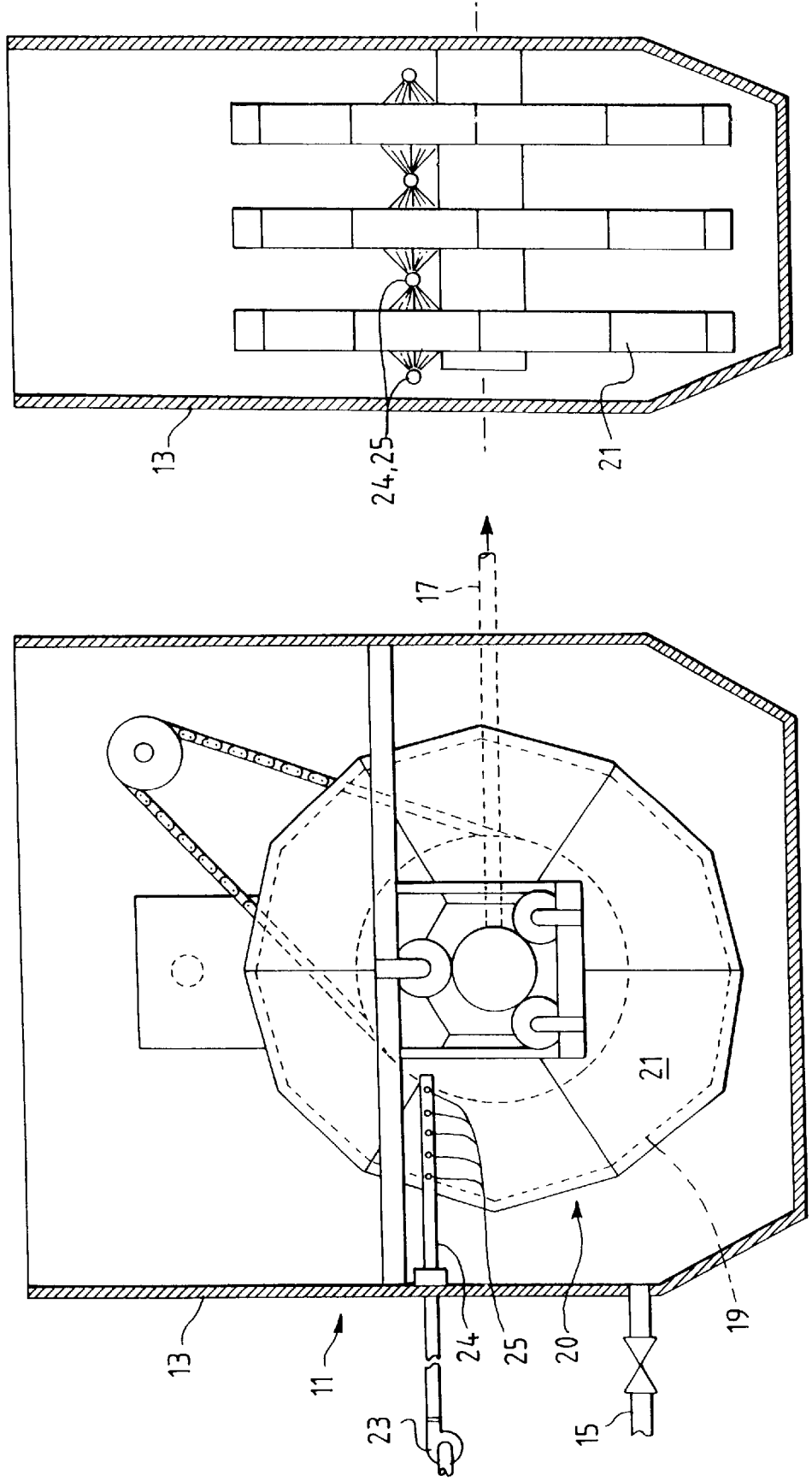
FIG. 1 is a diagrammatic vertical sectional view through a typical rotating disk filter apparatus, with parts broken away to illustrate details of construction.

FIGS. 1 AND 1A depict a filter apparatus 11 that applies the principles of the present invention to a known device. The filter apparatus 11 is particularly applicable to wastewater treatment. The filter apparatus 11 includes a filter tank 13 having an influent inlet 15 and an effluent outlet 17, filter frames 19 disposed between the influent inlet 15 and the effluent outlet 17, rotating filter 20 and filter media 21 supported by each filter frame 19. In alternative embodiments, the filter apparatus 11 may include additional filter frames or a single filter frame. In addition, filtering may occur from the outside of the frames into the center or in the reverse direction.

The filter apparatus incorporates a cleaning system that includes a high pressure spray assembly that is operable to direct a high velocity liquid stream to the surfaces of the filter material. The high pressure spray means includes a high-pressure pump 23 that is connected to a set of spray nozzles or spray heads 25, which are attached to the spray arm 24. Each spray head 25 is positioned at a specific distance from an influent surface of the filter media 21. When operated, the high-pressure pump 23 delivers a liquid stream at high pressure through the spray arm 24 to each of the spray heads 25, and each spray head 25 directs a high velocity liquid stream against a portion of the surface of filter media 21. The liquid stream acts to wash the influent surface of filter media 21 and to remove solids that have accumulated thereon. The liquid stream also penetrates the influent surface to impact and dislodge filtered solids entrained within the filter material. In alternative arrangements, the spray heads are positioned inside the effluent chambers to direct liquid streams in opposite directions against portions of the effluent surfaces.

Prior to operation of the high pressure spray cleaning cycle, the liquid level in the filter tank 13 is preferably lowered to a height below the spray heads 25. Typically, the filter operation is stopped and sufficient liquid volume is drained from the filter tank to expose the spray heads 25. By exposing the spray heads 25, the high pressure spray means is operated more efficiently and more effectively. The filter frames 19 and hence filter media 21 are then rotated until the entire filtering area has passed under the spray heads 25.

The problems of the prior art pressurized spray filter cleaning methods—uneven distribution of wash flow per unit of filter surface area and uneven distribution of hydraulic energy per unit of filter surface area—have independent solutions that are not readily compatible. Correcting the distribution of wash flow per unit area can be accomplished by repositioning the nozzles 25 on the spray arm 24 and by adjusting their angular orientation.

Figure 2:
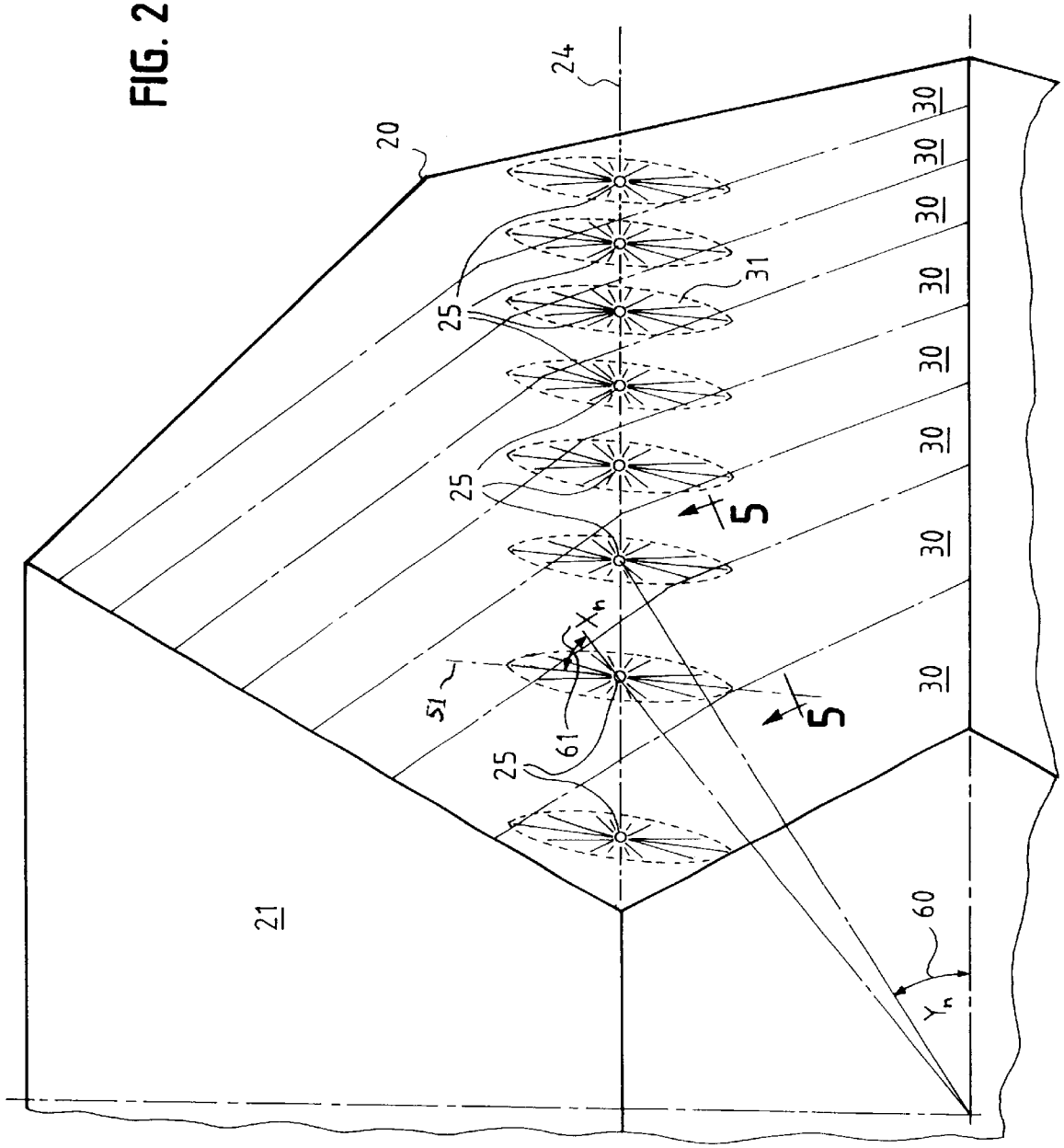
FIG. 2 is a diagrammatic view of a filter media showing a geometric division of the filter media into concentric bands of generally equal surface area.

One method, illustrated in FIG. 2, involves dividing the operative filter area 21 into concentric bands 30 of equal surface area ($A_b$), the number of bands 30 corresponding to the desired number of nozzles (n) 25.

The selection of a desired number of nozzles 25 is a matter of design preference. While any number of nozzles 25 may be selected, the improvements in cleaning efficiency are achieved to a greater degree as the number of nozzles 25 increases.

Since the concentric bands 30 have equal surface area, they have a generally decreasing radial width from the innermost to the outermost band 30 to compensate for a generally increasing band circumference. Therefore, when using a single nozzle type for all positions on the spray arm, the major axis 51 of the spray fan 31 must be equal to or larger than the innermost band width.

Choosing a nozzle 25 with a spray fan major axis 51 (FIG. 4) that is larger than the width of the innermost band 30 provides greater flexibility in the selection of the degree of overlap desired between adjacent spray fans 31. Alternatively, similar flexibility may be achieved by using different nozzle types having larger spray fan axes at the inner bands and smaller spray fan axes at the outer bands.

Given a known number of bands 30 and a constant surface area per band, the diameter ($D_n$) and width ($b_n$) of any particular concentric band 30, can be determined by the following algorithms:

Eq. 1:

$$\sum_{n=1}^{nmax} D_n = \left[ \frac{A_2 + nA_b}{(\pi/4)} \right]^{1/2}$$

where:

$D_n$ = the outside diameter of the nth concentric band;

$A_2$ = inside disk area (non-filtering)

$A_b$ = fitering area per nozzle

Eq. 2:

$$\sum_{n=1}^{nmax} b_n = \frac{D_n - D_i}{2}$$

where:

$b_n$ = the width of the nth concentric band;

$D_i = D_{n-1}$ = the inside diameters of the nth concentric band

Spray nozzles 25 with the same flow and pressure rating are then spaced along the spray arm 24 so as to be located in the middle of each concentric band 30. If the spray arm 24 is oriented along a radius of the rotating filter 20, the nozzles are then rotated according to a primary angle ($X_n$) 61 so that the major axis 51 of the fan spray contact area 31 for each nozzle 25 spans at least the distance between the inner and outer boundaries of the associated concentric band 30.

Because of clearances required between the spray arm and the tank water surface during pressure spray operation, and because this tank water level must provide the gravity driving head for the waste wash water flowing through the filter media and the effluent conduits, such water level is commonly higher than the horizontal center line of the filter disks. It is, therefore, commonly desirable to have the spray arm 24 in a non-radial relationship to the rotating filter 20 (FIG. 2). If the spray arm 24 is offset parallel to a radius of the filter, the nozzles may remain centered on the corresponding radial bands determined by Equation 1, but an adjustment to the angular orientation must be made such that it consists of a primary angle ($X_n$) 61 and a secondary offset angle ($Y_n$) 60 according to the following equations:

Primary Angle $X_n = COS^{-1}(S_n)$ where
$S_n = [b_n + 2b_{n+1} \times OL]/H$                                    Eq. 3:

Secondary Angle $Y_n = SIN^{-1}(P_n)$ where
$P_n = L_o/[R_n - (b_n \times 0.5)]$                                     Eq. 4:

where:

$L_o$ = parallel offset distance of spray arm 24 from radial position $R_n = \dfrac{D_n}{2}$ which is equal to the radial length at the outer boundary of the nth concentric band 30

$b_n$ = the radial width of the nth concentric band 30

$OL$ = spray fan contact area overlap 36, expressed as a percentage of the distance between adjacent nozzle 25 as measured along the axis of the spray arm 24

$H$ = the length of the major axis 51 of the spray fan contact area 31

Figure 3:
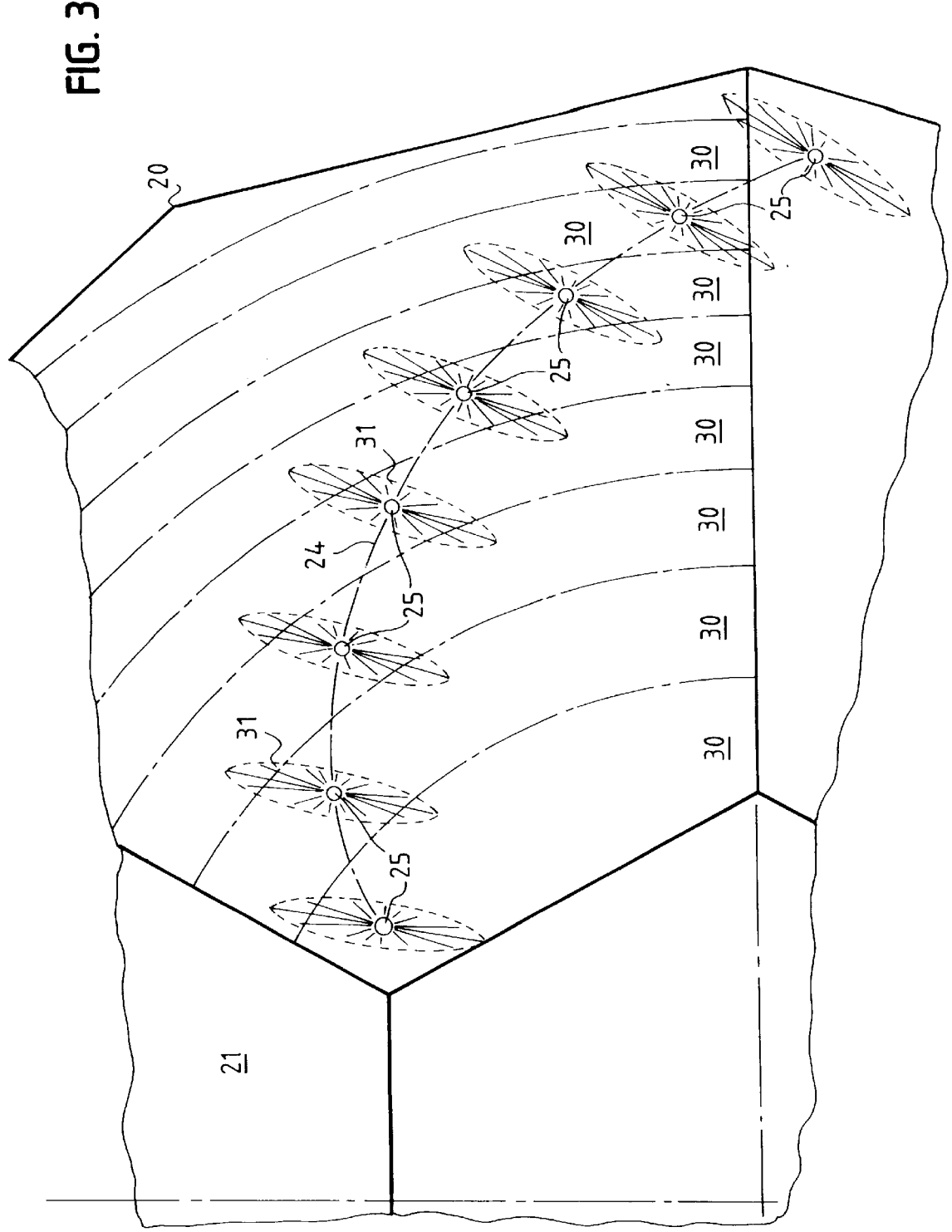
FIG. 3 is a diagrammatic view of an involute shaped spray arm, with equal spacing of the nozzles on the spray arm.

In an alternative to the preferred structure and method, the spray arm 24 can be of an involute shape, as shown in FIG. 3, which would allow for nearly equal spacing of the nozzles 25 on the spray arm 24. In another alternative to the preferred structure and method, the nozzles 25 can vary in size and in shape so that the dimensions of the contact area under the spray fan area 31 better match the varying dimensions of each radial band of the filter media and its overlap requirements.

Figure 4:
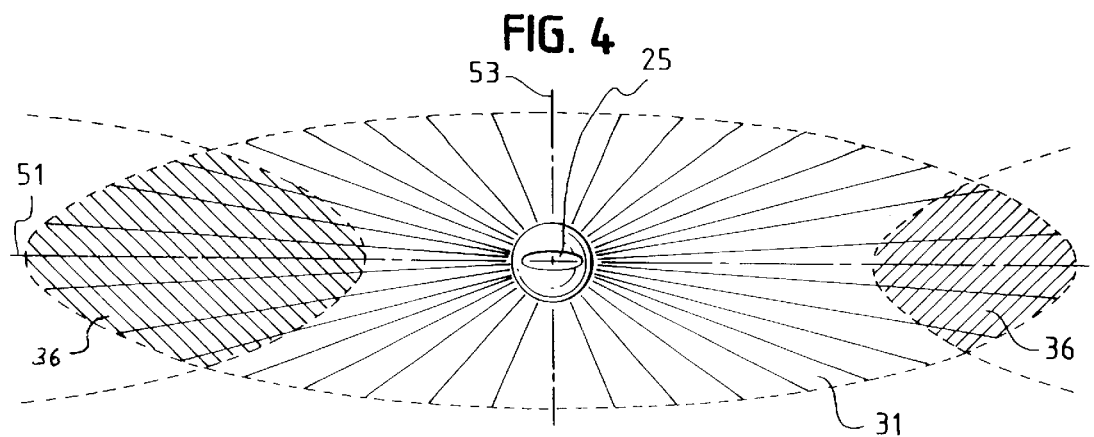
FIGS. 4 and 4A are diagrammatic top and profile views of a spray nozzle showing a typical elliptical spray pattern having a minor axis and a major axis.
Figure 4A:
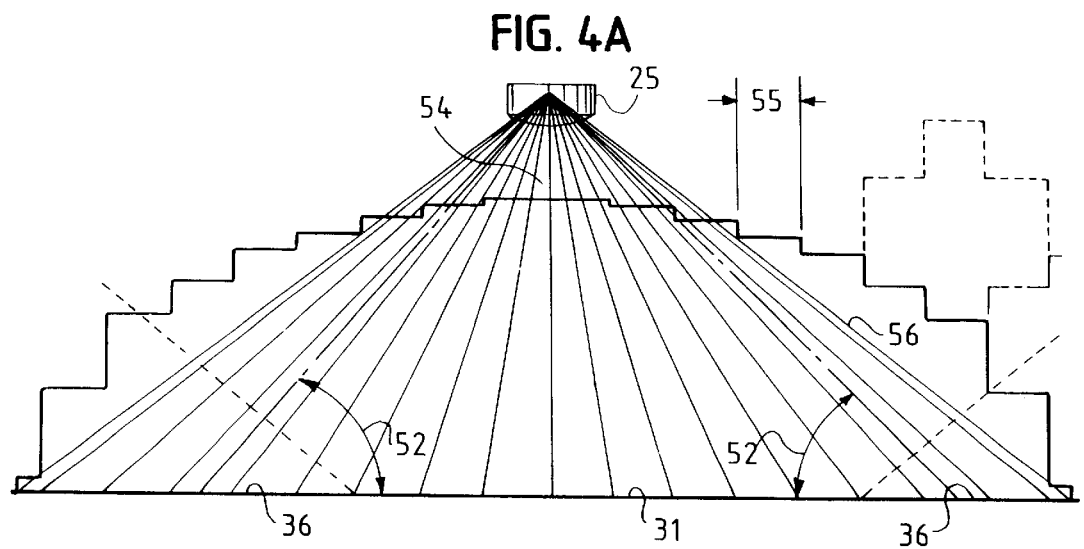

Following the flow distribution corrections for the high pressure spray applications described above, the hydraulic energy applied to the filter media 21 remains unbalanced due primarily to the varying array of contact angles 52 (FIG. 4A) produced by the nozzles 25. In these applications of the invention, compensating for the uneven distribution of hydraulic energy across the nozzle contact area 31 requires a conversion of the actual flow into an expression of cleaning effectiveness, herein referred to as the "effective flow", that expresses the work performed by the applied flow on the filter media 21. In most applications, the nozzles 25 used on a spray arm 24 for pressurized cleaning of filter media 21 have a fan shape contact area 31 that induces spray contact with the filter media 21 in a generally elliptical pattern. FIGS. 4 and 4A show a typical elliptical spray pattern having a minor axis 53 and a major axis 51. The trajectory of the jet stream 56 in relation to the plane of the filter media 21 defines a contact angle A 52. The contact angle A 52 varies across the contact area having its highest (most nearly vertical) values in the vicinity of the minor axis 53 and having its lowest values (most nearly horizontal) in the outer portions of the major axis 51. The higher contact angle 52 applies greater hydraulic energy to the filter media and a corresponding greater cleaning power, particularly for driving deep seated solids through the media. Therefore, in a situation where the flow distribution is nearly equalized with a minimum of spray overlapping, the cleaning power of the spray arm 24 remains out-of balance due to the variations in hydraulic energy across the contact area 31 of each nozzle 25.

To correct for this cleaning energy imbalance, the actual flow in the overlapping contact area must be raised beyond a mere hydraulic flow equilibrium to a point of overcompensation when compared to the flow at the center segment of the nozzle 25. This overcompensation is best related to the center nozzle flow by a power factor (P), the product of which defines the effective flow. The power factor is expressed as the "sine" of the mean contact angle 52, (P=SIN [A]) within a given overlapping spray contact area 31 between adjacent nozzles 25. The effective flow range simulates a closer power relationship to that of the nozzle center segment and allows for more convenient backwash cleaning adjustments for difficult filtering conditions.

Because of the configuration of the typical nozzle 25, the center segment 54 typically exhibits the highest actual flow and highest contact angle. Accordingly, the other segments 55 must be normalized against the characteristics of the center segment 54. The normalization process involves increasing the flow against the band area in the outer segments of each spray fan by overlapping the coverage area of adjacent nozzles 25.

Without the power factor application in the preferred embodiment, a mere equalization on the basis of flow only (one that accounted for the variation in flow along the major axis of each nozzle segment) would indicate an overlap requirement of 30 to 35%. In some applications of the inventions, however, this overlap would not achieve a uniform filter media cleaning that is optimally desired.

Figure 5:
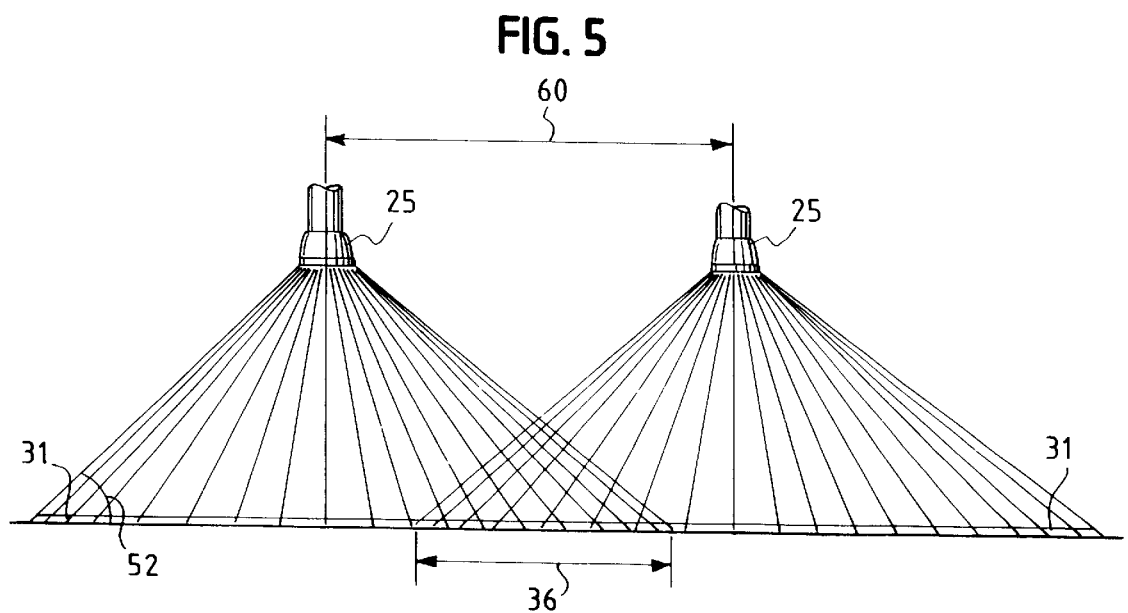
FIG. 5 is a sectional view of two adjacent spray nozzles taken along section line 5—5 of FIG. 2, showing a spray overlap between adjacent nozzle centers.

Taking variations in flow and contact angle 52 across each nozzle 25 into account, and applying the power factor, the effective flow is optimized across adjacent nozzle contact areas when the overlap 36 is typically within the range of approximately 40% to 100% of the radial projection 60 between adjacent nozzle centers (FIG. 5). A percentile spray overlap 36 from 40 to 100 percent of the radial projection 60 between adjacent nozzle centers covers an adjustment range typical for water filter applications It will be apparent to one of ordinary skill in the art that equalization of effective flow could alternatively be achieved in some other overlap range with variations in nozzle design or quantity. Since nozzle design adjustments are foreseeable, it is expected that the limits of the overlap ranges may also vary. However, the process of developing power factors based on the contact angle with an objective of creating a generally uniform distribution of cleaning effectiveness across a rotating filter, will reflect an application of the described method.

Generally, the inventions described herein provide systems and methods for improving the efficiency of cleaning filter media 21. The filter media 21 is divided into concentric bands 30 of approximately equal surface area having decreasing width and increasing circumference from the innermost to the outermost bands 30. Nozzles 25 are chosen by the user of the invention so that the spray fan area 31 generated against the filter media 21 has a major axis 51 at least as wide as the innermost band 30. The nozzle 25 is positioned in the middle of each concentric band 30. The major axis 51 of each spray fan area 31 is oriented in an angular relationship to the spray arm 24 so that adjacent spray fan tips cover an overlapping area of the filter media

21. An overlap arrangement that generally spans 40% to 100% of the radial distance between adjacent nozzles 25 achieves an equalization of applied wash water flow and hydraulic energy per unit of filter area so as to achieve a highly efficient cleaning of the filter media 21. In this improved condition, the filter is maintained in a more uniformly clean and effective filtering condition for larger periods of time than conventional techniques.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. A method for cleaning rotating filter media by pressurized spray, comprising the steps of:

providing at least one spray arm having a plurality of adjacent spray nozzles spaced along said spray arm, each of said nozzles producing an elliptical spray contact area on said filter media, said contact area having a major axis and a minor axis, said major axes having an orientation with respect to said spray arm;

affixing said plurality of spray nozzles on said at least one spray arm such that the spacing between nozzles is non-uniform and the orientation of the major axes of the contact areas of each of said nozzles is not colinear; and applying a pressurized flow to said at least one spray arm such that a portion of the filter media passing between adjacent nozzles receives a pressurized spray applied from each of said adjacent nozzles.

2. The method of claim 1 wherein each of said nozzles has a center, and said spacing between said centers can be expressed as a radial distance; and said portion of said filter media receiving a pressurized spray from each of said adjacent nozzles has a radial width between approximately 40% and approximately 100% of the radial distance between the centers of any two adjacent nozzles.

3. The method of claim 1, wherein the non-uniform spacing between the nozzles has a relationship to the portion of said rotating filter media to be cleaned; and wherein said relationship represents a geometric division of said filter media into concentric bands; said bands having a middle portion; said bands further having approximately equal surface area; wherein the center of each nozzle is positioned over the middle of a concentric band.

* * * * *